US008760347B1

(12) United States Patent
Lu

(10) Patent No.: US 8,760,347 B1
(45) Date of Patent: Jun. 24, 2014

(54) SYSTEM OF SYSTEMS APPROACH FOR DIRECTION FINDING AND GEOLOCATION

(75) Inventor: Ning Hsing Lu, Clifton, NJ (US)

(73) Assignee: Exelis Inc., McLean, VA (US)

( * ) Notice: Subject to any disclaimer, the term of this patent is extended or adjusted under 35 U.S.C. 154(b) by 283 days.

(21) Appl. No.: 12/710,802

(22) Filed: Feb. 23, 2010

(51) Int. Cl.
 G01S 3/02 (2006.01)
 G01S 5/04 (2006.01)

(52) U.S. Cl.
 USPC .......................... 342/465; 342/417; 342/432

(58) Field of Classification Search
 USPC ................. 342/417, 432, 438, 450, 465, 449
 See application file for complete search history.

(56) References Cited

U.S. PATENT DOCUMENTS

| 7,176,831 | B2* | 2/2007 | Dibble et al. | 342/357.48 |
| 7,206,609 | B2* | 4/2007 | Lin et al. | 455/562.1 |
| 7,592,956 | B2* | 9/2009 | McPherson et al. | 342/458 |
| 2007/0045018 | A1* | 3/2007 | Carter et al. | 180/167 |
| 2007/0247368 | A1* | 10/2007 | Wu | 342/465 |

OTHER PUBLICATIONS

Xinrong Li, "RSS-Based Location Estimation With Unknown Pathloss Model", IEEE Transactions on Wireless Communications, vol. 5, No. 12, Dec. 2006; pp. 3626-3633.
Ralph O. Schmidt, "Multiple Emitter Location and Signal Parameter Estimation", IEEE Transactions on Antennas and Propagation, vol. AP-34, No. 3, Mar. 1986; pp. 276-280.
George V. Serebryakov, "Direction-of-Arrival Estimation of Correlated Sources by Adaptive Beamforming", IEEE Transactions on Signal Processing, vol. 43, No. 11, Nov. 1995; pp. 2782-2787.

Yihong Qi et al., "On Time-of-Arrival Positioning in a Multipath Environment", IEEE Transactions on Vehicular Technology, vol. 55, No. 5, Sep. 2006; pp. 1516-1526.
A. Tennant et al., "Direction Finding Using a Four-Element Time-Switched Array System", 2008 Loughborough Antennas & Propagation Conference; Mar. 17-18, 2008, Loughborough, UK; 2008 IEEE; pp. 181-184.
A. Tennant et al., "A Two-Element Time-Modulated Array With Direction-Finding Properties", IEEE Antennas and Wireless Propagation Letters, vol. 6, 2007; pp. 64-65.
Harry Urkowitz, "Energy Detection of Unknown Deterministic Signals", Proceedings of the IEEE, vol. 55, No. 4, Apr. 1967; pp. 523-531.
Ning H. Lu, "Linearized, Unified Two-Ray Formulation for Propagation over a Plane Earth", Sicon/05—Sensors for Industry Conference; Houston, Texas, USA, Feb. 8-10, 2005.

(Continued)

*Primary Examiner* — Cassie Galt
(74) *Attorney, Agent, or Firm* — Edell, Shapiro & Finnan, LLC

(57) ABSTRACT

Systems and methods are provided herein that extend well-known direction finding (DF) and geolocation (GEO) concepts and approaches to a plurality of RF sensors to form a System of Systems (SoS) DF-GEO approach. The RF sensors may be collocated or spatial separated, and are able to exchange or share DF/GEO data. The SoS DF-GEO approach opportunistically leverages both on-board and off-board processing resources and DF-GEO measures for cooperative processing, situation awareness sharing, and performance optimization. The off-board processing resources and DF-GEO measures may be shared via networking. Thus, the SoS DF-GEO approach primarily bases measurements upon RSS or energy obtained from a one-antenna system or from a two-antenna system of a single RF sensor, as well as from other RF sensors via networking. By adopting the innovative SoS DF-GEO concept approach as described herein, optimized DF-GEO performance can be obtained by using the system of systems approach.

20 Claims, 13 Drawing Sheets

COMPARING THE TWO ANTENNA PATTERNS GIVES THE DOA MEASURE:

(56) References Cited

OTHER PUBLICATIONS

Guolin Sun et al., "Signal Processing Techniques in Network-Aided Positioning", IEEE Signal Processing Magazine Jul. 12, 2005.
Bo-Chieh Liu et al., "Analysis of Hyperbolic and Circular Positioning Algorithms Using Stationary Signal-Strength-Difference Measurements in Wireless Communications", IEEE Transactions on Vehicular Technology, vol. 55, No. 2, Mar. 2006; pp. 499-509.
Ada S. Y. Poon et al., "Degrees of Freedom in Multiple-Antenna Channels: A Signal Space Approach", IEEE Transaction Information Theory Society, vol. 51, Issue 2.

* cited by examiner

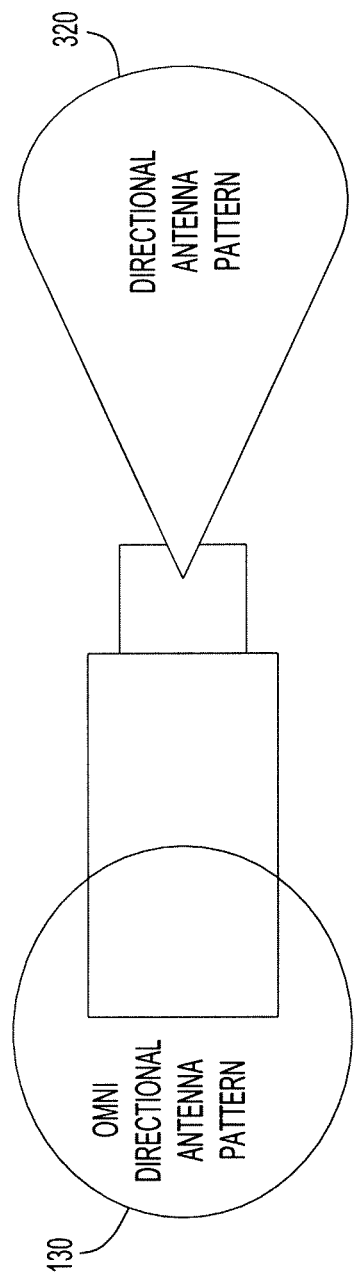
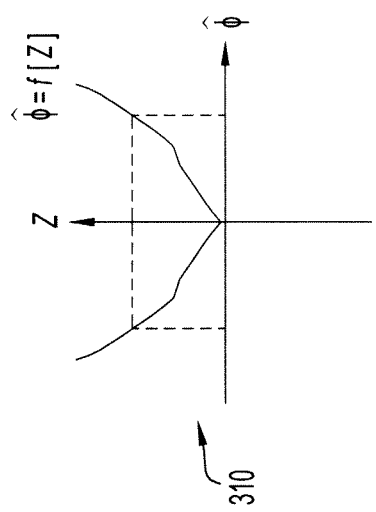
COMPARING THE TWO ANTENNA PATTERNS GIVES THE DOA MEASURE:
FIG.3

SYSTEM OF SYSTEMS APPROACH FOR DIRECTION FINDING AND GEOLOCATION

FIELD OF THE INVENTION

Embodiments of the present invention are related to systems and methods for quickly and effectively direction finding and geolocating radio frequency (RF) emitters.

BACKGROUND OF THE INVENTION

Direction finding (DF) and Geolocation (GEO) approaches are commonly used to identify, track, and geolocate various sources of radio transmissions. DF is the process of obtaining the direction of arrival (DOA) bearings of radio signal emitter (s) of interest. On the other hand, GEO is the process of determining, either directly or indirectly based on DF estimates and/or other measures, the locations of radio signal emitter(s) of interest. DF and GEO techniques, which have been researched over the last few decades, are mostly understood. The theory and applications of DF/GEO are well described in the open literature and, as such, need not be further described herein. DF and GEO procedures for identifying and/or locating RF emitters are usually based on energy/amplitude comparison, interferometric, time-of-arrival (TOA), time-difference-of-arrival (TDOA), and other antenna null-steering approaches. These approaches usually demand special antennas, close-tolerance amplitude/phase RF receiver components, enhanced receiver dynamic range, and expanded processing bandwidth. DF/GEO systems can calculate the direction of arrival (DOA) of a particular RF emitter using an array of spatially displaced antennas or rotating antenna. Nearly all DF algorithms require that signals from multiple antennas are received and routed to multiple signal processors synchronously. These signal processors are then used to compare the amplitude/energy, phase, and TOA/TDOA from the various signals to derive the DOA and then location of the RF emitter.

One method for finding distance to an emitter is to use the received signal strength (RSS) or the received signal energy, which is an integration of the RSS over a pre-defined signal duration. Ignoring propagation channel irregularities, the RSS is inversely proportional to a function of the distance between the emitter and the receiver. However, when channel effects are included and depending on the amount of short-term fading variations the may be averaged out of the calculations, the root-mean square (RMS) path loss variations may possibly be up to ±10 dB. Because the processing algorithm is, in general, based on an indirect estimation of the RSS/energy at an RF sensor from the emitter, there are many potential errors. Potential errors occur because the RSS/energy not only depends on the transmit power, the distance between emitter and sensor receiver, but also depends on multi-path propagation, shadowing, and fading effects. In addition, in order to reduce estimation errors when working with the real data, the DF/GEO process must first remove the outlying samples or measurements by filtering or pre-screening the raw RSS/energy data, and/or averaging out several measurements prior to processing the data for DF/GEO calculations. Regardless, the energy-based method generally provides a more robust approach than other known methods when the emitter signal characteristics are unknown to an RF sensor, the observer.

In light of the foregoing, there is a need to find different or alternative energy-based approaches that can more quickly and more effectively DF and/or GEO RF emitters of interest.

SUMMARY OF THE INVENTION

Embodiments of the present invention extend the well-known DF/GEO concepts and approaches to a plurality of RF sensors to form a System of Systems (SoS) DF-GEO approach. The RF sensors may be collocated or spatial separated, and are able to exchange or share DF/GEO data. The SoS DF-GEO approach opportunistically leverages both on-board and off-board processing resources and DF-GEO measures for cooperative processing, situation awareness (SA) sharing, and performance optimization. The off-board processing resources and DF-GEO measures may be shared via networking. Thus, the SoS DF-GEO approach primarily bases measurements upon RSS or energy obtained from a one-antenna system or from a two-antenna system of a single RF sensor, as well as from other RF sensors via networking. The attainable DF-GEO accuracy is limited by underlying operating environments, background noise or interference conditions, time-varying channel characteristics, and physical/electrical design constraints. By adopting the innovative SoS DF-GEO concept approach as described herein, optimized DF-GEO performance can be obtained by using the system of systems approach.

More specifically, embodiments of the present invention provide a system/method for generating a first energy measure for a signal received from an emitter of interest at an omnidirectional antenna at the first location. A second energy measure is generated for a signal received from the emitter of interest at a directional antenna stationed at the first location. A first direction of arrival (DOA) is computed for the signals received at the first location based on a comparison of the first and second energy measures. Third and fourth energy measures are generated for the signals received from the emitter of interest at a second location. A second DOA is computed for the signals received at the second location based on a comparison of the third and fourth energy measures, and geolocation data may be computed for the emitter of interest using the first and second DOAs. The third and fourth energy measures may be shared with a sensor platform stationed at the first location, or the sensor platform may be moved to the second location, and the third and fourth energy measures are generated at the sensor platform. Shared information may include one or more of the third and fourth energy measures, a coefficient associated with the third and fourth energy measures, a direction of arrival of the signal received at the second location, and the coordinates of the second location.

In one embodiment RSS can be used to derive the energy measure. The RSS may be sampled and summed over a pre-determined time interval within the signal duration to obtain the energy measure.

In another embodiment, the geolocation data are computed by simultaneously solving a set of equations based on the energy measures. The set of equations may be solved using a Least Mean Square Error (LMSE) method. A coefficient may be computed for each energy measure other than the first energy measure, the first energy measure being a reference, as a measure of reliability of each subsequent energy measure. Computing geolocation data may include computing DOAs for signals received at any one location, and computing the coefficient for each energy measure may include computing a coefficient based on a ratio of the first energy measure to subsequent energy measures and/or a ratio of a sine of a DOA of signals received at the first location to a sine of a DOA of signals received at subsequent locations. The coefficient for each energy measure may be computed as a weighted average of an energy-based coefficient and a DOA based coefficient.

In another embodiment, the system is deployed on a mobile RF sensor to implement the SoS DF-GEO methodology while moving, i.e., the mobile sensor may be moved to the second location to generate the third and fourth energy measures, or the third and fourth energy measures are generated at the second location and shared with geolocation equipment at the first location. Therefore, data may be shared between one or more locations or sensor platforms, and may include one or more energy measures, parameters or coefficients associated with the energy measures, DOAs of signals received at the various locations, and the coordinates of the various locations. The parameters or coefficients associated with the energy measures may be associated with the reliability of the energy measures.

In one embodiment, the RF signals are detected with single antenna systems, whereas in other embodiments multiple antennas or multiple systems with one or more antennas may be employed.

These and other features of the several embodiments of the invention along with their attendant advantages will be more fully appreciated upon a reading of the following detailed description in conjunction with the associated drawings.

BRIEF DESCRIPTION OF THE DRAWINGS

FIG. 3 shows a mobile sensor with two antennas configured to calculate a DOA in accordance with an embodiment of the invention.

DETAILED DESCRIPTION

Figure 1:
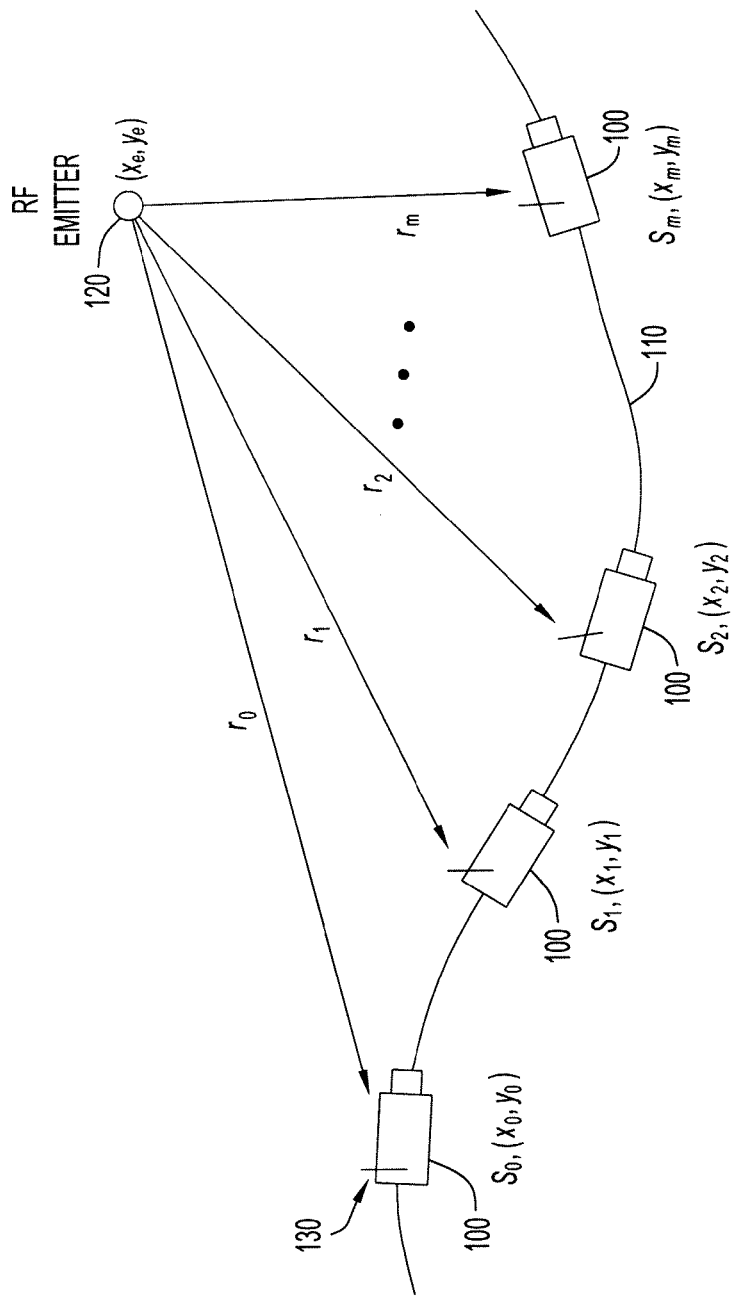
FIG. 1 depicts a setting for describing RF emitter location using multiple RSS measurements in accordance with an embodiment of the present invention.

Referring first to FIG. 1, a setting for describing RF emitter location using multiple RSS measurements is shown. The setting includes an RF emitter of interest 120, and a mobile sensor 100 that travels along pathway 110. The platform 100 has a single antenna 130 receiving signals from the RF emitter 120. The RF emitter 120 is at location ($x_e$, $y_e$) as shown. The approach to resolving an emitter position is to estimate the signal energy via the RSS measurements obtained from multiple locations. In this example, the platform 100 takes m RSS measurements denoted as $S_0$-$S_m$ at locations ($x_0$, $y_0$)-($x_m$, $y_m$), respectively. The RSS measurements correspond to a radius or distance from RF emitter 120 shown at $r_0$-$r_m$. The RSS measure can be viewed as a special case of the energy measure, in which only single signal sample is used for the measurement at each location. The measurements from multiple locations could be attained by taking measurements from a single platform traveling to different locations or by taking measurements from various platforms at different locations and networking/sharing the data to perform DF-GEO. Since there are measurement errors due to path loss modeling, signal fading, shadowing effects, noise/interference, antenna pattern effects, time-varying channel and transmit power effects, and implementation errors, computing the emitter position may use an LMSE method. An example localization algorithm using an LMSE method will be described later.

The SoS energy-based DF-GEO approach may be classified into two variants: 1) a one-antenna energy-based approach and 2) a two-antenna energy-based DOA approach. The two variants stem from the fact that different RF sensor types may have different antenna resources. For an RF sensor with one omnidirectional antenna, e.g., antenna 130, the antenna is generally mounted at the rear of the mobile sensor and the antenna is configured to receive all bands of interest. For an RF sensor with two antennas, a directional antenna is generally mounted towards the front of the mobile sensor, while an omnidirectional antenna is generally mounted at the rear of the mobile sensor. There is no significance to the placement of the antennas. A signal switch matrix may be employed in the receive architecture so that the appropriate antenna outputs may be assigned to multiple receivers simultaneously. The following two sections will discuss the one-antenna and two-antenna variants.

One-Antenna Energy-Based Approach

Figure 2:
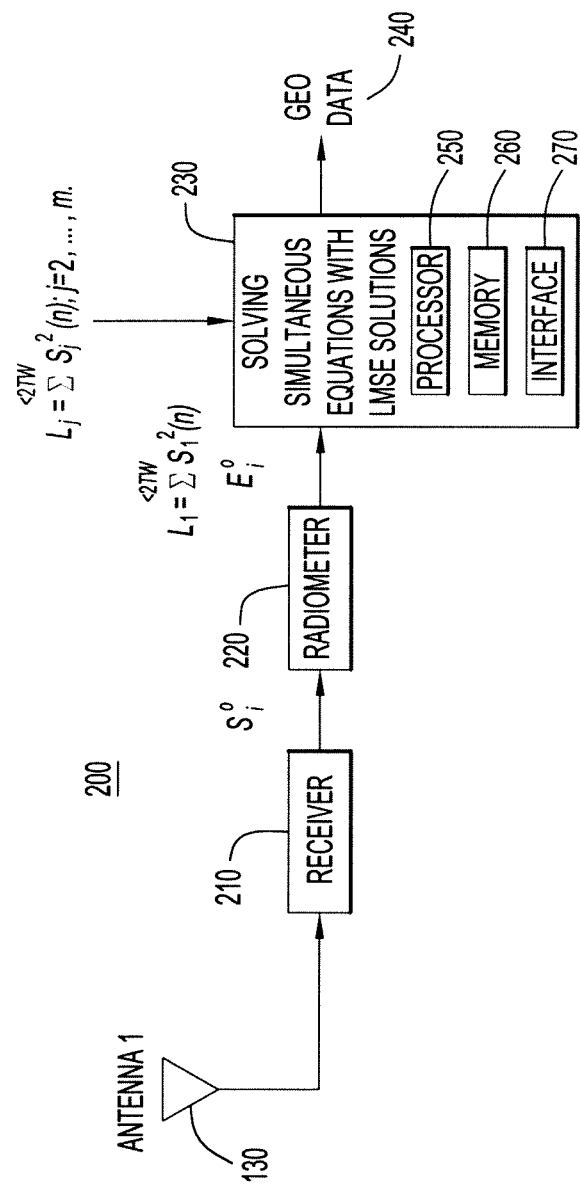
FIG. 2 depicts a functional block diagram of a system for computing GEO data using RSS measurements from a single antenna in accordance with an embodiment of the present invention.

FIG. 2 shows a functional block diagram of a system 200 for GEO estimation using the energy-based approach with one omni-directional antenna. The antenna 130 feeds a receiver 210, and the receiver contains a detector or radiometer 220 (i.e., an energy detector), which provides an energy measure of the detected signal. The detector may be any receiver, detector, radiometer, or other device capable of measuring the energy of a signal. The energy measure from the radiometer is denoted by $L_1$. Denote W as the noise bandwidth and T as the observation interval. It is assumed that n(t) is bandlimited white noise of spectral density $N_0/2$, and that the inphase and quadrature phase lowpass noise components $n_c(t)$ & $n_s(t)$ have flat power spectral densities, each equal to $N_0$ over $|f|<W/2$. There are 2TW independent low-pass samples in an observation interval of T. At processing block 230, the location of the emitter of interest, i.e., GEO data 240, may be solved from a set of simultaneous equations via an LMSE approach. In this example the energy measure $L_1$ is taken at a first location, e.g., ($x_0$, $y_0$) in FIG. 1. The remaining samples going into processing block 230, taken at locations j-m, may be provided by moving the RF sensor or may be provided by other RF sensors.

Processing block 230 may include a data processing device 250, a memory 260, and an interface unit 270. Resident in the memory 260 is software configured to execute processing logic to compute GEO data 240. The data processing device 250 may be a microprocessor, a microcontroller, systems on a chip (SOCs), or other fixed or programmable logic. The memory 260 may be any form of random access memory (RAM) or other data storage block that stores data used for the techniques described herein. The memory 260 may be separate or part of the processor 250. Instructions for computing GEO data 240 may be stored in the memory 260 for execution by the processor 250 such that when executed by the processor 250, causes the processor 250 to perform the functions described herein. The interface unit 270 enables communication between devices in system 200 and other systems employing the SoS energy-based DF-GEO approach. It should be understood that any of the devices in the SoS may be configured with a similar hardware or software configuration as network device processing block 230.

The functions of the processor 250 may be implemented by a processor readable tangible medium encoded with instructions or by logic encoded in one or more tangible media (e.g., embedded logic such as an application specific integrated circuit (ASIC), digital signal processor (DSP) instructions, software that is executed by a processor, etc.), wherein the memory 260 stores data used for the computations or functions described herein (and/or to store software or processor instructions that are executed to carry out the computations or functions described herein). Thus, functions for computing GEO data 240 may be implemented with fixed logic or programmable logic (e.g., software or computer instructions executed by a processor or field programmable gate array (FPGA)).

Two-Antenna Energy-Based DOA Approach

FIG. 3 shows a mobile sensor with two antennas configured to calculate DOAs. The first antenna 130 is an omni-directional antenna and the second antenna 320 is a directional antenna. The directional antenna 320 may be a sectorized antenna, rotatable about one or more axes, and/or a smart antenna with multiple elements. The antenna characteristics (e.g., the far-field radiation pattern) are known and stored on board. At 310, the received signals create a function $f[Z]$ that can be compared to the stored antenna patterns to derive DOA measurements, as will be described hereinafter.

Figure 4:
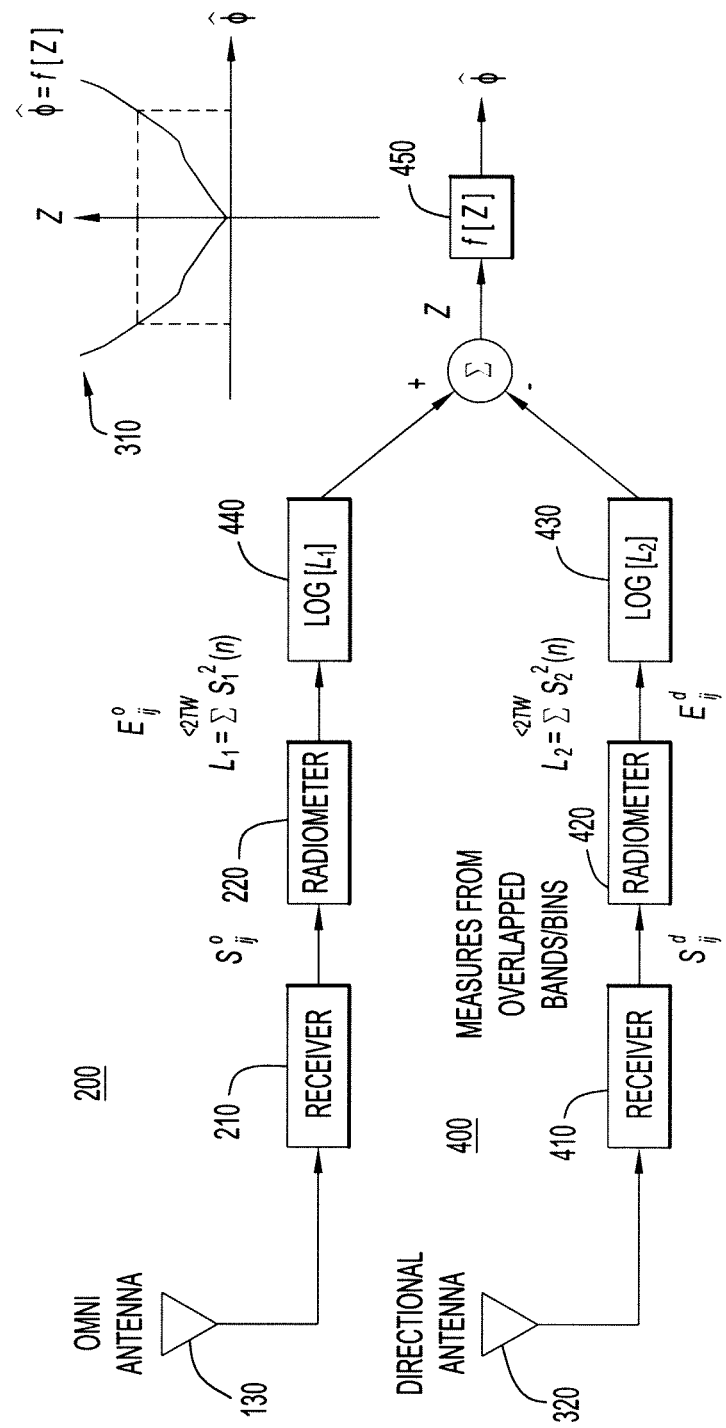
FIG. 4 depicts a functional block diagram of a system for computing DF/GEO data using RSS measurements from two antennas in accordance with an embodiment of the present invention.

FIG. 4 shows a functional block diagram of the DOA estimation via the energy-based comparison approach using two antennas. The omni-directional antenna system 200 from FIG. 2 is shown along with second antenna system 400. System 400 uses the directional antenna 320. Antenna 320 feeds receiver 410 which contains a radiometer 420 (i.e., an energy detector), which provides the energy measure of the detected signal. The energy measures from the radiometers are denoted by $L_1$ and $L_2$. At 430 and 440, the logarithm of energy measures $L_1$ and $L_2$ are computed, e.g., using software and/or hardware similar to that described with respect to processing block 230 (shown in FIG. 2). At 450, the difference of the Log [•] outputs of the energy measures creates a function $f[Z]$ that can be used to derive the DOA of the received signal from the stored antenna patterns. The relative antenna patterns, which are used to compare the relative strength between the omni-directional and directional antennas, can relate the function $f[Z]$ to the DOA or Line-of-Bearing (LOB) of the received signal. The location of the emitter may be solved from a set of simultaneous equations via a LMSE approach.

The following table lists the major factors that may impact the DF-GEO performance and compares the severity of the performance impacts for the two energy-based approaches:

| Factors that may impact DF-GEO performance | Severity of Performance Impacts | |
| --- | --- | --- |
| | One-Ant Energy-based | Two-Ant Energy-based DOA |
| Path Loss Modeling Error | High | Low/None |
| Signal Fading Effects | High | Low/None |
| Noise/Interference | Medium | Medium |
| Antenna Pattern and on-the-move (OTM) Errors | Medium | Medium/Low |
| Time Varying Transmit Power | High/Medium | Low/None |
| Time Varying Channel Effects | High | Low/None |
| GPS (RF sensor) Position Error | Low | Low |
| Networking Latency | High/Medium | Low/None |

Energy Estimation

This section describes the performance characteristics of energy estimation of the emitter signal. Understanding the performance characteristics of energy estimation is important because the SoS DF-GEO core approach bases measurements upon RSS or energy. It is assumed that the receiver is tuned to a desired frequency band, and a single signal is first processed and detected. It is also assumed that the white Gaussian noise in each of the receivers is statistically independent, have equal power, and have power spectral density of $N_0$ known to those skilled in the art. With continued reference to FIG. 4, let $E_i$ be the energy of the $i^{th}$ detected signal measured at the peak of the antenna pattern, T be the observation interval, and W be the measurement bandwidth. $E_i$ is a non-central chi-square ($\chi^2$) random variable with $\gamma=TW$ degrees of freedom and a non-central parameter $\lambda_i$, i.e., the received signal space has dimension TW, then $$E_i = \sum_{n=1}^{\geq TW} S_i^2(n)$$

The measurement interval may equal to or be less than the signal duration in a channel. The signal to-noise ratio (SNR), denoted by $\rho_i$, may be expressed in the following equation:

$$\rho_i = \frac{E_i}{N_0 \gamma} = \frac{E_i}{N_0 TW}$$

$\lambda_i$ may be shown in terms of the $i^{th}$ signal energy as $$\lambda_i = \frac{2E_i}{N_0} = 2\rho_i TW; i = 1, \ldots, I$$

where I designates the total number of antenna outputs; e.g., i=1 for single antenna system, i=2 for two-antenna system, etc. Assuming the in-phase and quadrature-phase components of the complex envelope of the signal are Gaussian variables, the mean and variance of $L_i$ are determined to be:

$$m_i = E[L_i] = \lambda_i + 2\gamma_i = 2TW(1+\rho_i)$$

and $$\sigma_i = \text{Var}[L_i] = 4\lambda_i + 4\lambda_i = 4TW(1+2\rho_i)$$

When the product TW is large, the central limit theorem indicates that $L_i$ is approximated by a Gaussian variable. $L_i$ is the $i^{th}$ test statistics of the radiometer for signal detection. In this case $L_i=E_i$, i.e., the test statistic is also the signal energy. Thus, the probability of false alarm ($P_f$) and the probability if detection ($P_d$) are $$P_f = \frac{1}{2}\text{erfc}\left[\frac{V_T - 2TW}{(8TW)^{0.5}}\right]$$

and $$P_d = \frac{1}{2}\text{erfc}\left[\frac{V_T - 2TW - \lambda}{(8TW + 8\lambda)^{0.5}}\right]$$

where erfc is the complementary error function and $V_T$ is the threshold used to detect the signal of interest.

Propagation Channel Characteristics

Figure 5:
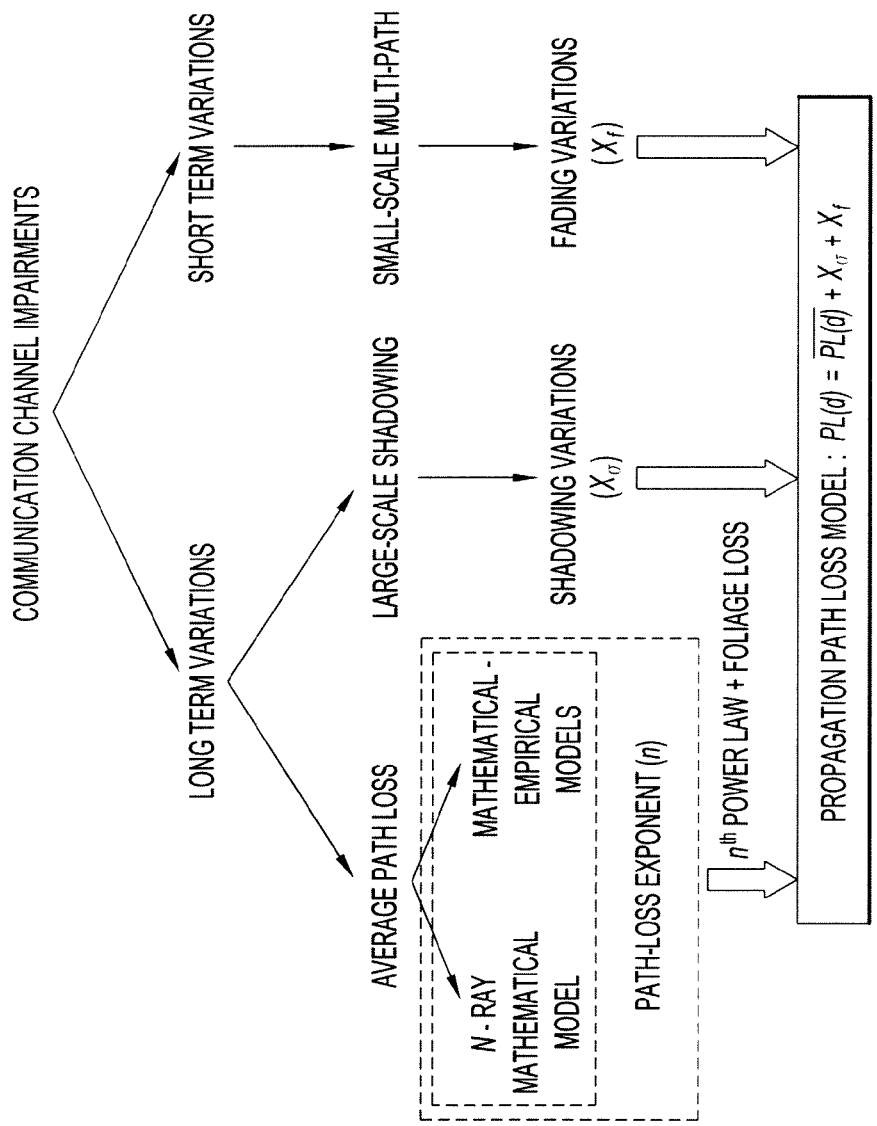
FIG. 5 depicts an example channel impairment model.

FIG. 5 summarizes the commonly used communication channel impairment model. As shown, the impairments could be results from long-term and short-term channel variations. The long-term variations may be modeled by an average path loss model and a large-scale shadowing model. The short-term variations may be modeled by a small-scale multipath model. The average path loss model commonly uses an N-ray mathematical model or an empirical model. The large-scale shadowing model may be modeled using shadowing variations with the log-normal statistics. The small-scale multipath model may use Rayleigh or Rician fading models with appropriate fading variations. The propagation path loss model PL(d) in dB may be written as the following:

$$PL(d)=\overline{PL(d)}+X_\sigma+X_f$$

where $\overline{PL(d)}$ represents the average path loss, $X_\sigma$ represents the shadowing variations, and $X_f$ represents the fading variations.

Figure 6:
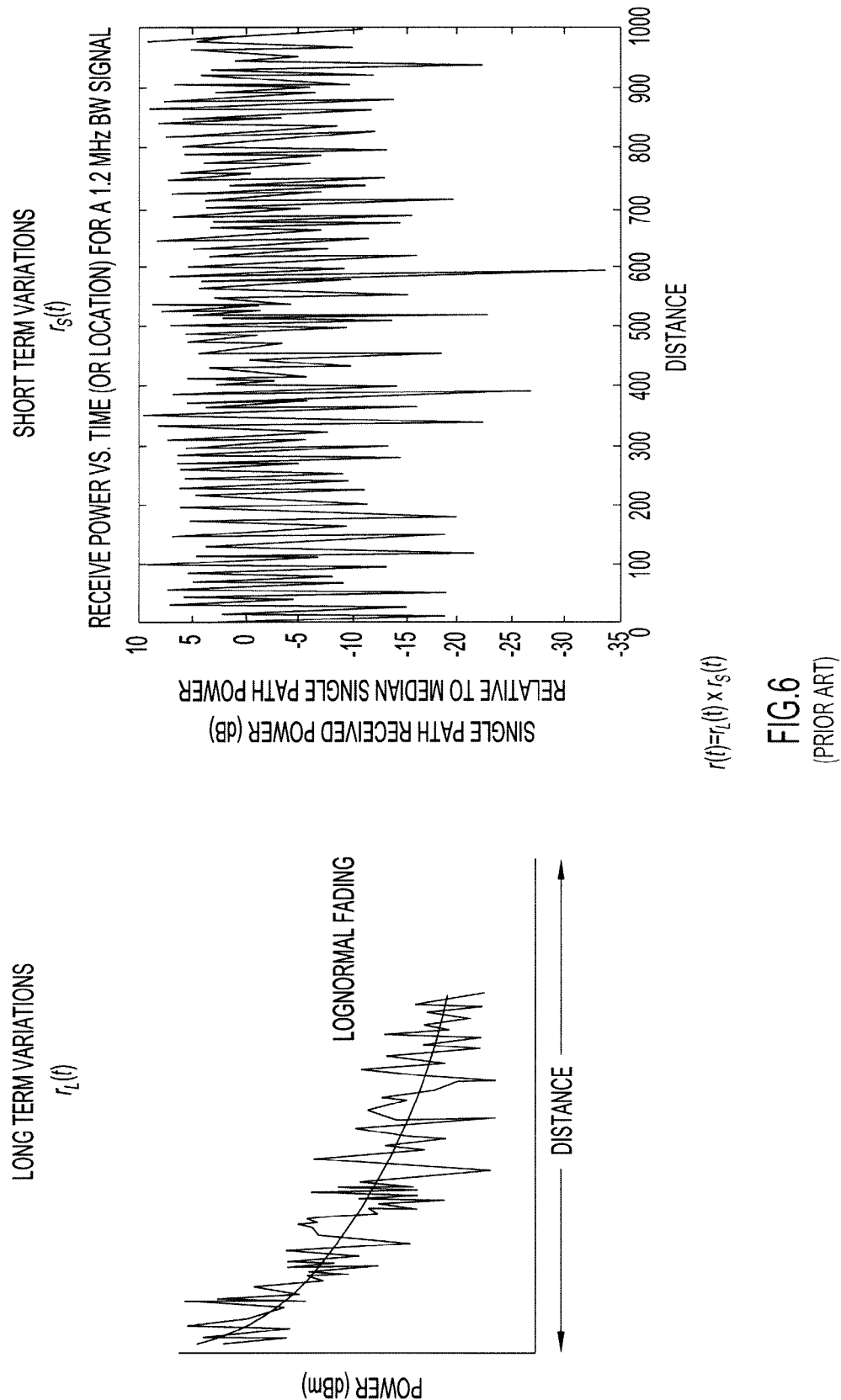
FIG. 6 shows example graphs depicting long term and short term channel variations.

FIG. 6 shows example graphs depicting the long-term and short-term channel variations. The overall RSS path loss is the multiplicative result of the two variations. The short-term variation may be averaged out, if the observation time is sufficiently long. However, it may not be possible to average out the long-term variations unless the observation time is a relatively long time interval, which may not be feasible and/or practical.

Figure 7:
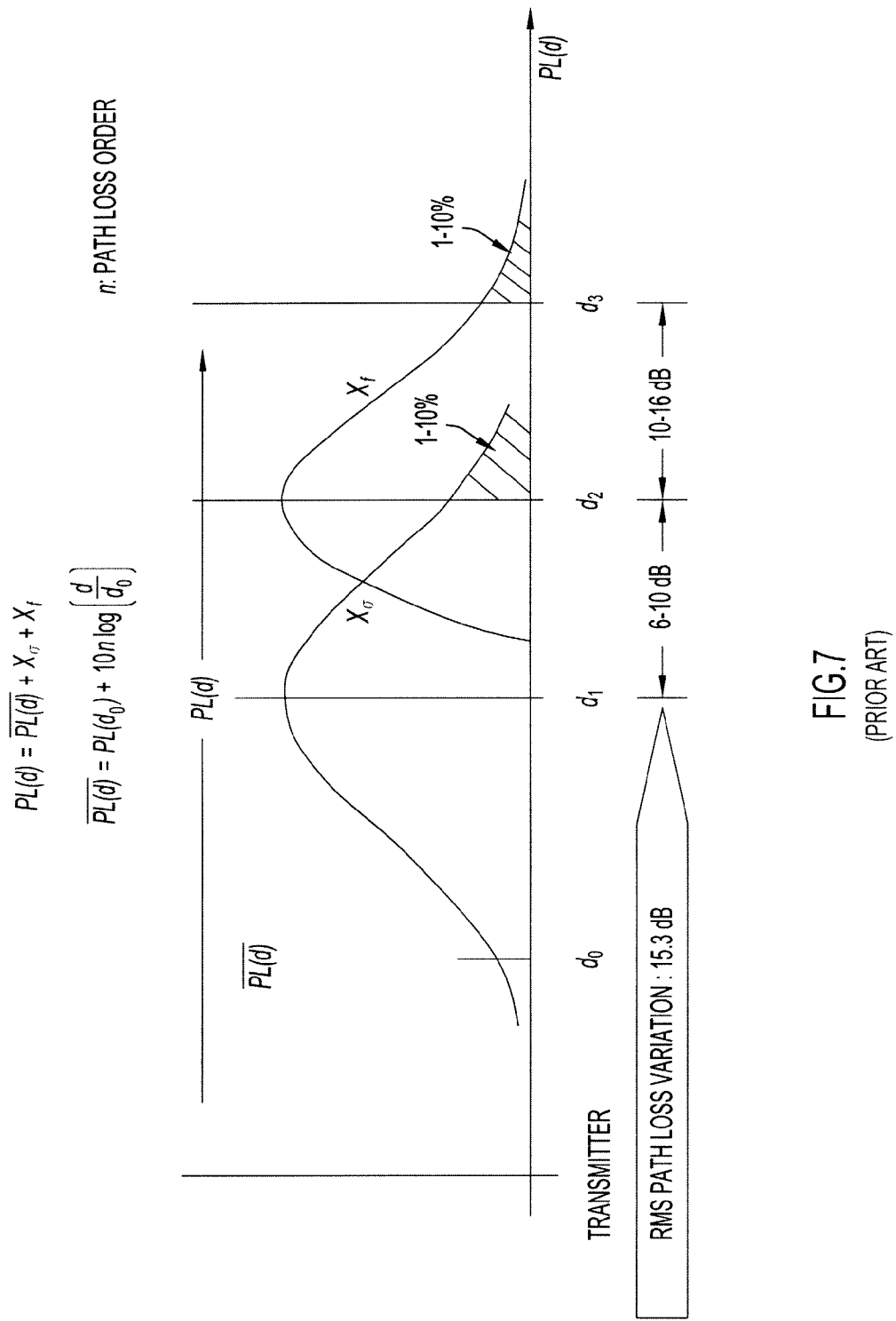
FIG. 7 shows an example graph depicting RMS path loss variations.

FIG. 7 shows the total composite RMS path loss variations that may be expected in a real world environment. The composite RMS path loss is multiplicative in nature; thus, the propagation path loss model PL(d) in dB is cumulative in nature. PL(d) in db is the sum of the average path loss $\overline{PL(d)}$, the shadowing variations $X_\sigma$, and the fading variations $X_f$.

As describe above, depending on the amount of short-term fading variations the may be averaged out of the calculations, RMS path loss variations may possibly be up to ±10 dB due to potential errors. Potential errors occur because the RSS/energy not only depends on the transmit power, the distance between emitter and sensor receiver, but also depends on multi-path propagation, shadowing, and fading effects. To reduce estimation errors, the DF/GEO process must first remove the outlying samples or measurements by filtering or pre-screening the raw RSS/energy data, and/or averaging out several measurements prior to processing the data for DF/GEO calculations.

The Localization Algorithm

This section presents an overview of the localization approach and processing algorithm using an LMSE method. The localization algorithm converts the energy measures directly or indirectly to the location of the emitter. The process itself is commonly referred to as Geolocation. Let (x, y) be the position of the emitter node to be estimated and ($x_i$, $y_i$) be the measuring position of location i. The distance between the emitter node and the measuring location i, denoted by $r_i$, may be expressed as:

$$r_i^2=(x-x_i)^2+(y-y_i)^2$$

Without loss of generality, let ($x_0$, $y_0$) be the origin of coordinates, i.e., $x_0=y_0=0$. Thus, $$r_0^2=x^2+y^2$$

and $r_i^2-r_0^2=x_i^2+y_i^2-2xx_i-2yy_i$ for $i\geq 1$

Equivalently, we have the following equation:

$$\left[\frac{r_i^2}{r_0^2}-1\right]r_0^2 + 2xx_i + 2yy_i = x_i^2 + y_i^2$$

The above equation can be simplified using a coefficient or parameter $\beta$. Let $$\beta_i = \left[\frac{r_i^2}{r_0^2}-1\right],$$

describing the above expression in a matrix form gives:

$$\begin{bmatrix}\beta_1 & 2x_1 & 2y_1 \\ \beta_2 & 2x_2 & 2y_2 \\ \vdots & \vdots & \vdots \\ \beta_m & 2x_m & 2y_m\end{bmatrix} \cdot \begin{bmatrix}r_0^2 \\ x \\ y\end{bmatrix} = \begin{bmatrix}x_1^2 + y_1^2 \\ x_2^2 + y_2^2 \\ \vdots \\ x_m^2 + y_m^2\end{bmatrix}$$

or in a simplified form $H \cdot X = R$, where $$H = \begin{bmatrix}\beta_1 & 2x_1 & 2y_1 \\ \beta_2 & 2x_2 & 2y_2 \\ \vdots & \vdots & \vdots \\ \beta_m & 2x_m & 2y_m\end{bmatrix}, X = \begin{bmatrix}r_0^2 \\ x \\ y\end{bmatrix}, \text{ and } R = \begin{bmatrix}x_1^2 + y_1^2 \\ x_2^2 + y_2^2 \\ \vdots \\ x_m^2 + y_m^2\end{bmatrix}$$

As shown from the above equations, ($x_i$, $y_i$), i+0, ... m, are the known positions of measuring locations and $r_0$, x, and y are unknowns to be solved. If $\beta_i$, i=1, ..., m, can be estimated using the measurements, we may solve the above equations. We need at least four independent measurements (i.e., m+1≥4) at various locations to form the three equations (i.e., m=3). Because there are path loss model errors, signal fading and/or shadowing effects, noise/interference, and implementation errors that impact the measurement, X may not be solved with exact solutions to the above equations.

Denoting the error vector be $\xi$ gives the following relationship:

$$\xi=H \cdot X-R$$

If $X_o$ provided a LMSE solution to the problem, such that the LMS error can be shown as:

$$\xi_o=H \cdot X_o-R$$

Then the transpose of the H matrix must orthogonal to the LMS error vector $\xi_o$:

$$H^T\xi_o=0$$

Thus, $X_o$ must satisfy the following orthogonal property.

$$H=H^T\xi_o=H^TH\cdot X_o-H^TR=0$$

Therefore, the LMSE solution, $X_o$, is given by:

$$X_o=(H^TH)^{-1}H^TR$$

Substituting the LMSE solution to the system equation gives the LMS error $\tau_o$:

$$\xi_o=[H(H^TH)^{-1}H^T-I]R$$

where I is the identity matrix. $(H^TH)^{-1}H^T$ is a projection matrix that projects the vector R onto the column space of H. Similarly, $[H(H^TH)^{-1}H^T-I]$ is a projection matrix that projects the R matrix onto the orthogonal complement of the column space of H. Geometrically, the projection of the vector R onto the orthogonal complement of the column space of H assures the orthogonally between the error vector and the column space of H that provides the LMSE solution.

Geolocation Performance

As shown from the localization equations, $(x_i, y_i)$, $i=0, \ldots, m$, are the known positions of measuring locations and $r_0$, x, and y are unknowns to be solved. If we could derive $$\beta_i = \left[\frac{r_i^2}{r_0^2} - 1\right],$$

from measurements, then the unknowns can be solved. The following two sections will discuss the one-antenna and two-antenna energy-based approaches to deriving $\beta_i$.

One-Antenna Energy-based Approach

Assuming that the emitter signal power levels are equal and the path loss follows the $n^{th}$ power law, we have the relationship between the received signal energy ($E_i$) and the distance ($r_i$):

$$\frac{E_i}{E_0} = \left(\frac{r_0}{r_i}\right)^n = \left(\frac{r_0^2}{r_i^2}\right)^{n/2},$$

or equivalently, $$\left(\frac{E_0}{E_i}\right)^{\frac{2}{n}} = \left(\frac{r_i^2}{r_0^2}\right)$$

Since $$\beta_i = \left[\frac{r_i^2}{r_0^2} - 1\right],$$

we have the following equivalent expression:

$$\beta_i = \left[\left(\frac{E_0}{E_i}\right)^{\frac{2}{n}} - 1\right]$$

As shown, the path loss order n must first be estimated to compute the unknowns in X. If the actual path loss characteristics deviate from the assumed characteristics, then the solution for X could be erroneous. Because of the potential localization error, it is desirable to use measurement data obtained from a local region having similar path loss characteristics. The sensitivity of the path loss modeling error to the DF-GEO performance will be analyzed and assessed hereinafter for the impacts to the overall system performance. In addition, the emitter signal power levels are assumed to be equal, which may be a weak assumption unless the measurements are taken at the same time.

Given the mean and variance of $L_i$ shown above and the processing algorithm described earlier, assume the reference SNR is measured at 100 m away from the emitter. TW is the time-bandwidth product of the signal known to those skilled in the art. Denote n as the average power order of path loss in the region and Distance Root Mean Squared (DRMS) as the square root of the average of the square distance errors of estimated coordinates (x, y) of the emitter.

The following table, Table 1, shows the DF-GEO performance for the energy-based geolocation approach using measurements from multiple positions randomly distributed over an 800 m by 800 m area. As shown in Table 1, the performance is quite sensitive to the estimation error of the path loss model and the transmit power variations.

TABLE 1

| Transmit Power/Channel Variation (rms), dB | 1.5 | | | 3 | | | 4.8 | | | 10 | | |
|---|---|---|---|---|---|---|---|---|---|---|---|---|
| Actual Path Loss Order (n) | 2 | 2.83 | 4 | 2 | 2.83 | 4 | 2 | 2.83 | 4 | 2 | 2.83 | 4 |
| Estiamted Path Loss Order (nn) | 2.83 | 2.83 | 2.83 | 2.83 | 2.83 | 2.83 | 2.83 | 2.83 | 2.83 | 2.83 | 2.83 | 2.83 |
| DRMA, Meters | 44.63 | 40.35 | 41.61 | 90.91 | 75.18 | 76.03 | 130.49 | 106.74 | 110.66 | 166.60 | 157.86 | 143.67 |
| Range Errors, Meters | 35.13 | 34.07 | 35.88 | 62.11 | 56.51 | 58.17 | 60.00 | 58.64 | 59.22 | 66.10 | 61.05 | 61.29 |
| Bearing Errors @ 100 m, Degrees | 24.05 | 21.97 | 22.59 | 42.28 | 35.42 | 37.25 | 52.54 | 46.87 | 51.24 | 59.03 | 57.65 | 55.16 |
| Bearing Errors @ 50 m, Degrees | 41.75 | 38.90 | 39.76 | 61.19 | 54.59 | 56.67 | 69.04 | 64.90 | 65.50 | 73.29 | 72.43 | 70.81 |

Two-Antenna Energy-Based DOA Approach

This section presents the performance analysis of the energy-based Direction of Arrival (DOA) approach using simultaneous measurements from multiple antennas. The mounted system uses a directional antenna mounted towards the front of the mobile sensor and an Omni antenna mounted at the rear of the mobile sensor, each covering RF bands of interest. A flexible switch matrix may be provided in the receiver system architecture to assign antenna outputs to multiple receivers simultaneously. Comparing the two antenna patterns yields a convenient DOA measure that can be used to estimate the DOA of received signals.

Figure 8:
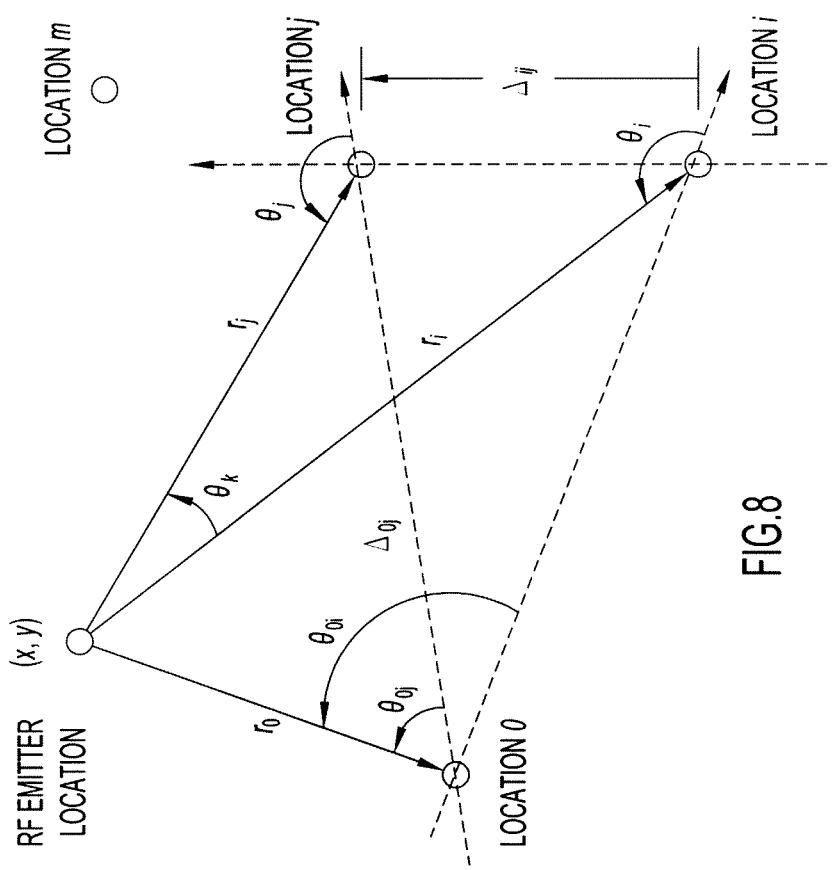
FIG. 8 depicts the geometric relationship between the emitter and various measurement locations in accordance with an embodiment of the present invention.

FIG. 8 illustrates the geometric relationship from multiple measuring locations to an emitter. Denoting the distance between location i and location j as $\Delta_{ij}$ and applying the Law of Cosines give the following identity:

$$r_i^2 = r_0^2 + \Delta_{0i}^2 - 2 \cdot r_0 \cdot \Delta_{0i} \cdot \cos(\theta_{0i})$$

for location i and location 0. Applying the Law of Sines gives the following relationship:

$$\frac{\sin(\theta_i - \theta_{0i})}{\Delta_{0i}} = \frac{\sin(\theta_{0i})}{r_i} = \frac{\sin(\pi - \theta_i)}{r_0}$$

$$\frac{r_i}{r_0} = \frac{\sin(\theta_{0i})}{\sin(\pi - \theta_i)} = \frac{\sin(\theta_{0i})}{\sin(\theta_i)}$$

Using the relationship, $$r_i^2 - r_0^2 = r_0^2 \left[ \left( \frac{\sin(\theta_{0i})}{\sin(\theta_i)} \right)^2 - 1 \right],$$

gives the following equation:

$$\left[ \left( \frac{\sin(\theta_{0i})}{\sin(\theta_i)} \right)^2 - 1 \right] r_0^2 + 2xx_i + 2yy_i = x_i^2 + y_i^2 \text{ for } i = 1, \ldots, m$$

Let $$\beta_i = \left( \frac{\sin(\theta_{0i})}{\sin(\theta_i)} \right)^2 - 1 \text{ for } i = 1, \ldots, m,$$

the simultaneous equations may be solved.

Note that the above expression no longer depends on the path loss characteristics (i.e., the path loss order n) and the emitter signal power, but requires the bearing estimate at each location, which is provided via the energy-based DOA approach. Thus, DOA estimation via the energy comparison of two collocated antennas mitigates the path loss modeling errors as well as time-varying channel and transmit power effects. Similarly, we put the above equation in the same matrix format, i.e., H·X=R. The LMSE solution, $X_o$ may be solved similarly:

$$X_o = (H^T H)^{-1} H^T R$$

Figure 10:
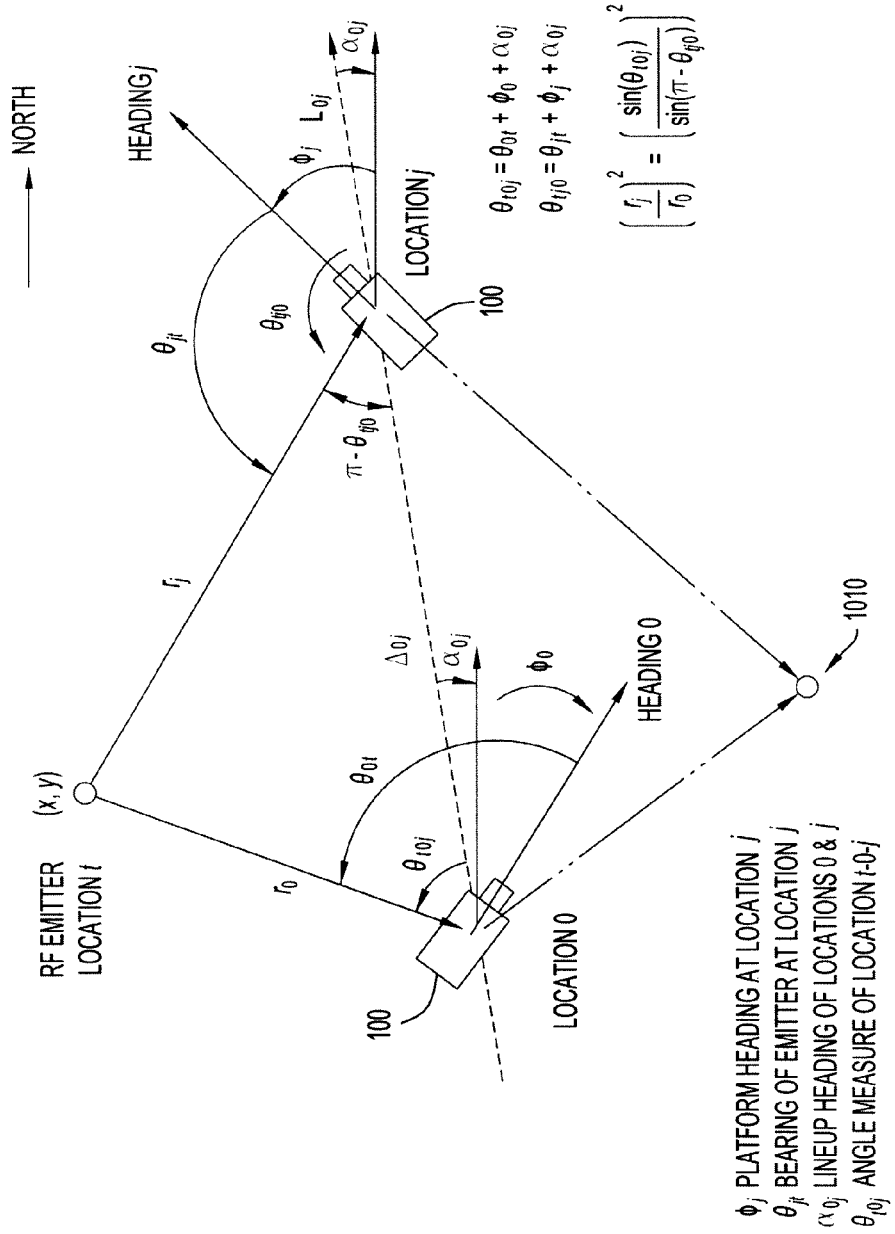
FIG. 10 shows a mobile sensor with two antennas taking DF measurements in two locations in order to calculate GEO data in accordance with an embodiment of the invention.

Because of the symmetrical nature of the antenna pattern, the two-antenna energy-based DOA approach can not differentiate the signal from the left or right of the RF sensor. Thus, each bearing estimate provides two possible bearing solutions about a given axis (an example is shown in FIG. 10). Given this bearing ambiguity of the system, the correct bearing must be selected prior to solving the equations.

Figure 9:
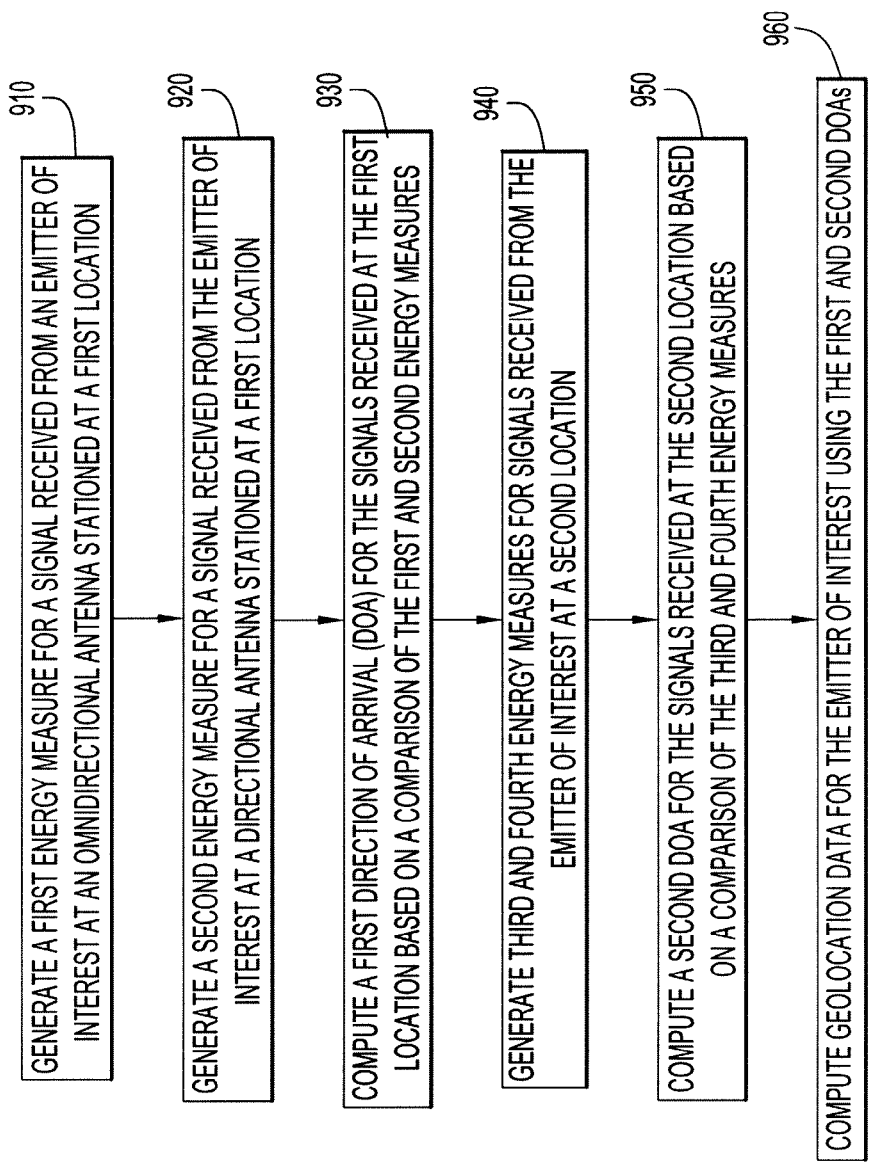
FIG. 9 shows a flowchart that depicts a series of steps for performing the DF-GEO methodology in accordance with an embodiment of the present invention.

Referring now to FIG. 9, the SoS DF-GEO methodology will now be described. At 910, a first energy measure is generated for a signal received from an emitter of interest at an omnidirectional antenna stationed at a first location. At 920, a second energy measure is generated for a signal received from the emitter of interest at a directional antenna stationed at the first location. At 930, a first direction of arrival (DOA) is computed for the signals received at the first location based on a comparison of the first and second energy measures. The energy measures can be compared to each other and to known antenna radiation patterns as described above.

At 940, third and fourth energy measures are generated for a signals received from the emitter of interest at a second location. At 950, a second DOA is computed for the signals received at the second location based on a comparison of the third and fourth energy measures, and at 960, geolocation data are computed for the emitter of interest using the first and second DOAs. The third and fourth energy measures may be shared with a sensor platform stationed at the first location, or the sensor platform may be moved to the second location as shown in FIG. 10, and the third and fourth energy measures are then generated at the sensor platform. Shared information may include one or more of the third and fourth energy measures, a coefficient associated with the third and fourth energy measures, a direction of arrival of the signals received at the second location, and the coordinates of the second location.

The third and fourth energy measures may be measured at a second sensor platform and shared with the sensor platform at the first location. Thus, data may be shared between one or more locations or sensor platforms, and may include one or more of energy measures, parameters or coefficients associated with the energy measures, a direction of arrival of signals received at the various locations, and the coordinates of the various locations. The parameters or coefficients associated with the energy measures may be associated with the reliability of the energy measures. The sharing of information provides improved overall situational awareness.

In one example, RSS is used as the energy measure. The RSS may be sampled and summed over a predetermined time interval. The geolocation data are computed by simultaneously solving a set of equations based on the energy measures. The set of equations may be solved using an LMSE method. A coefficient, e.g., $\beta_i$, may be computed for each energy measure other than the first energy measure, the first energy measure being a reference, as a measure of reliability of each subsequent energy measure. Computing geolocation data may include computing DOAs for signals received at any one location, and computing the coefficient for each energy measure may include computing a coefficient based on a ratio of the first energy measure to subsequent energy measures and/or a ratio of a sine of a DOA of signals received at the first location to a sine of a DOA of signals received at subsequent locations, as described above. The coefficient for each energy measure may be computed as a weighted average of an energy-based coefficient and a DOA based coefficient, as will be described hereinafter.

In one example, the DF/GEO system is deployed on a mobile sensor to implement the SoS DF-GEO methodology while moving, i.e., the mobile sensor may be moved to the second location to generate the third and fourth energy measures.

In one example, the RF signal is detected using single antenna systems, whereas in other example embodiments multiple antennas or multiple systems with one or more antennas may be employed.

By adopting the innovative SoS DF-GEO concept approach, optimized DF-GEO performance can be obtained using the best features of the one-antenna and two-antenna energy-based solutions from both on-board and off-board measurements via the SoS approach.

Turning to FIG. 10, a basic system diagram of the two-antenna energy-based DOA system is illustrated, which indicates the key bearings and angles that can be used to assess the relationship of these angles for measuring locations 0 and j and the RF emitter location t. To simplify the mathematical description of the problem, we'll use the following notation and convention to describe the angle relationships:

1. The location axis (L) is defined as the vector line from location 0 to location j, denoting as $L_{0j}$.
2. The polar angle of L is $\text{Tan}^{-1}(x/y)$, which (x, y) is for location j and (0, 0) for location 0.
3. Converging the bearing angles in reference of the location axis gives $$\theta_{0j} = \theta_{0t} + \phi_0 + \alpha_{0j}$$

$$\theta_{j0} = \theta_{jt} + \phi_j + \alpha_{0j}$$

$$\pi - \theta_{j0} = \pi - (\theta_{jt} + \phi_j + \alpha_{0j})$$

As shown, applying the Law of Sines gives the following relationship:

$$\left(\frac{r_j}{r_0}\right)^2 = \left(\frac{\sin(\theta_{0j})}{\sin(\pi - \theta_{j0})}\right)^2 = \left(\frac{\sin(\theta_{0j})}{\sin(\theta_{j0})}\right)^2$$

As noted above, there is location ambiguity associated with this approach. For both values of the bearing angle (i.e., $\pm\theta_{0j}$) in reference of the location axis $L_{0j}$, the same distance ratio of $r_j$ and $r_0$ is attained. As shown in FIG. 10, the ambiguous location is shown at 1010 and is symmetric with respect to the emitter location about the location axis $L_{0j}$. The ambiguity may be eliminated or mitigated by an SoS solution that provides measurements from different locations which then allows proper bearing selection.

Figure 11:
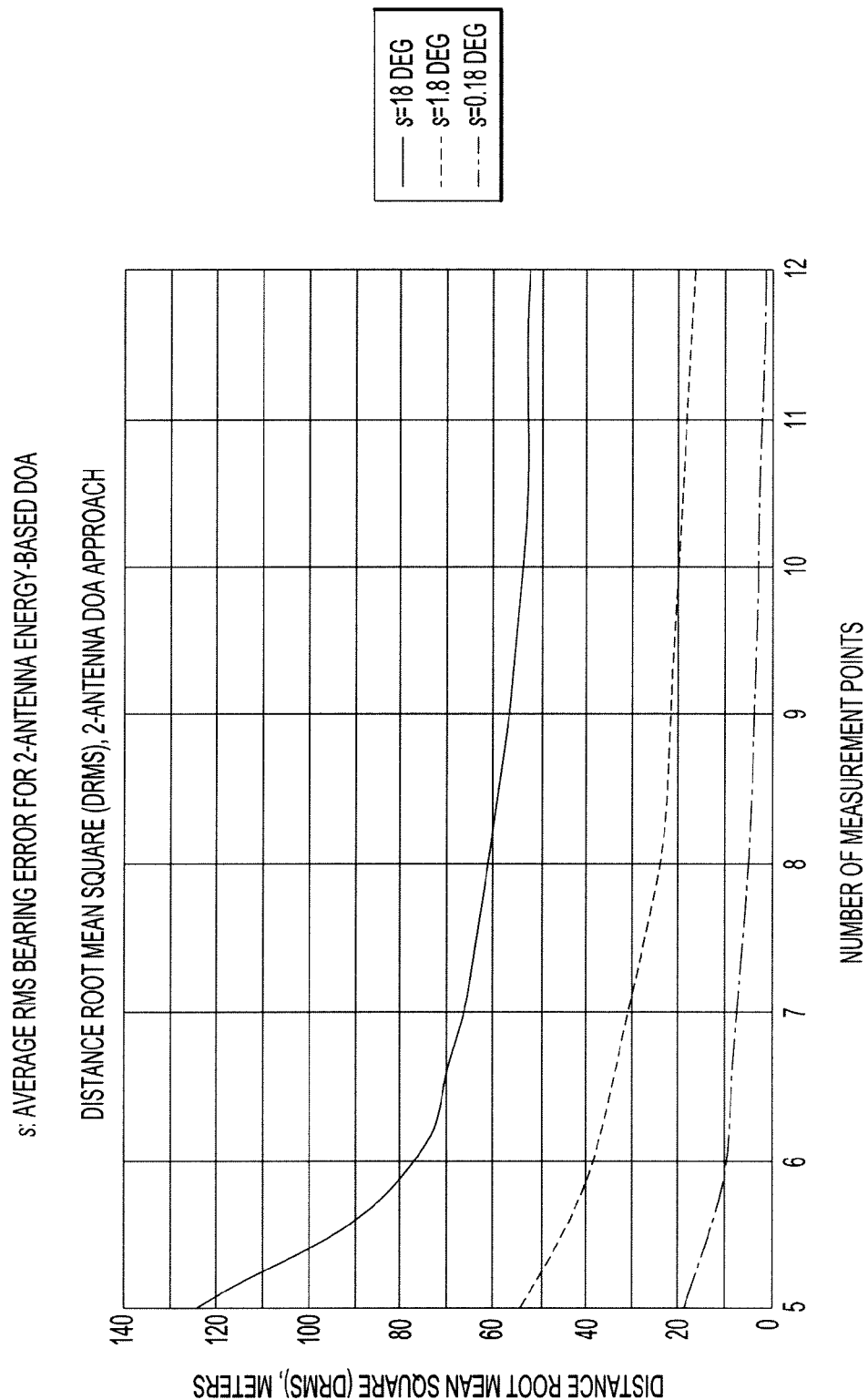
FIG. 11 shows an example graph depicting Distance RMS error at three levels of bearing error measurement in accordance with an embodiment of the present invention.
Figure 12:
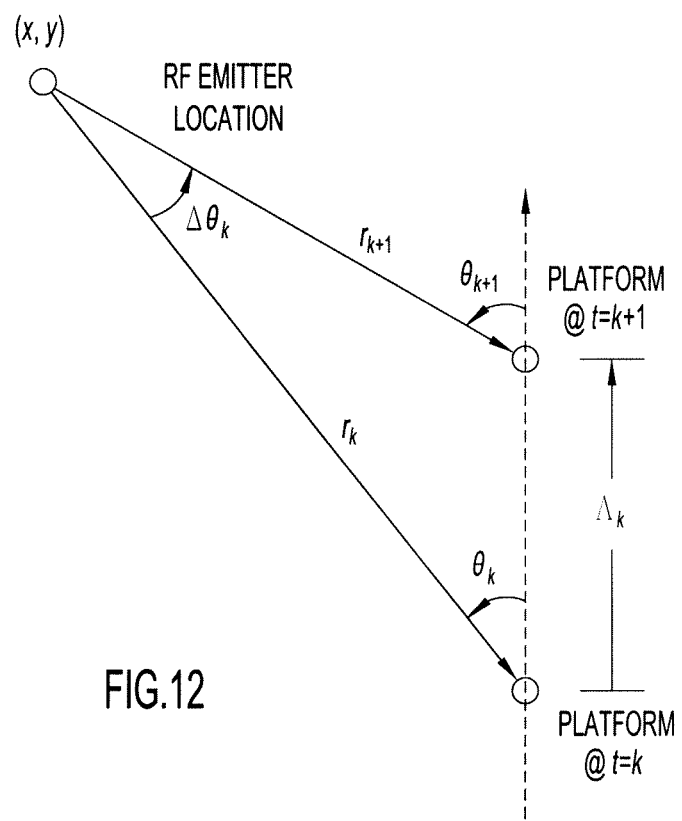
FIG. 12 depicts the geometric relationship between the emitter and two measurement locations to perform DF/GEO sensitivity analysis in accordance with an embodiment of the present invention.

FIG. 11 illustrates the Distance Root Mean Square (DRMS) GEO error, parameterized with DOA bearing measurement errors. As indicated, the performance of DRMS improves as the number of measurement points increase and the average RMS bearing errors (s) decrease.

DF-GEO Error Sensitivity Analysis

This section describes the DF-GEO error sensitivity analysis. DF-GEO error sensitivity analysis provides an insight to the overall DF-GEO problem and achievable performance. FIG. 11 shows the geometric relationship relating to measurements at multiple locations for the DF-GEO error sensitivity analysis.

Using the Laws of Sines, we have the following relationship:

$$\tan(\Delta\theta_k) = \frac{\frac{\Lambda_k}{r_k}\sin(\theta_k)}{1 - \frac{\Lambda_k}{r_k}\cos(\theta_k)}$$

Equivalently, $$\Delta\theta_k = \theta_{k+1} - \theta_k = \arctan\left(\frac{\frac{\Lambda_k}{r_k}\sin(\theta_k)}{1 - \frac{\Lambda_k}{r_k}\cos(\theta_k)}\right)$$

Using the Law of Cosines, we find $$r_{k+1} = r_k\sqrt{1 + \left(\frac{\Lambda_k}{r_k}\right)^2 - 2\left(\frac{\Lambda_k}{r_k}\right)\cos(\theta_k)}$$

Thus, we have $$\Delta r_k = \frac{r_{k+1}}{r_k} = \sqrt{1 + \left(\frac{\Lambda_k}{r_k}\right)^2 - 2\left(\frac{\Lambda_k}{r_k}\right)\cos(\theta_k)}$$

From the RSS/Energy measurement point of view, we have $$\Delta P_k = \frac{P_k}{P_{k+1}} \propto \left(\frac{r_{k+1}}{r_k}\right)^n_{n=[2,4]} = \left[1 + \left(\frac{\Lambda_k}{r_k}\right)^2 - 2\left(\frac{\Lambda_k}{r_k}\right)\cos(\theta_k)\right]^{n/2}$$

For ranges greater than the break point, the path loss becomes the $4^{th}$ power law (i.e., n=4):

$$\Delta P_k = \frac{P_k}{P_{k+1}} \propto \left(\frac{r_{k+1}}{r_k}\right)^4 = \left[1 + \left(\frac{\Lambda_k}{r_k}\right)^2 - 2\left(\frac{\Lambda_k}{r_k}\right)\cos(\theta_k)\right]^2$$

For ranges less than the break point, the path loss approaches the free space loss (i.e., n=2):

$$\Delta P_k = \frac{P_k}{P_{k+1}} \propto \left(\frac{r_{k+1}}{r_k}\right)^2 = 1 + \left(\frac{\Lambda_k}{r_k}\right)^2 - 2\left(\frac{\Lambda_k}{r_k}\right)\cos(\theta_k)$$

Figure 13:
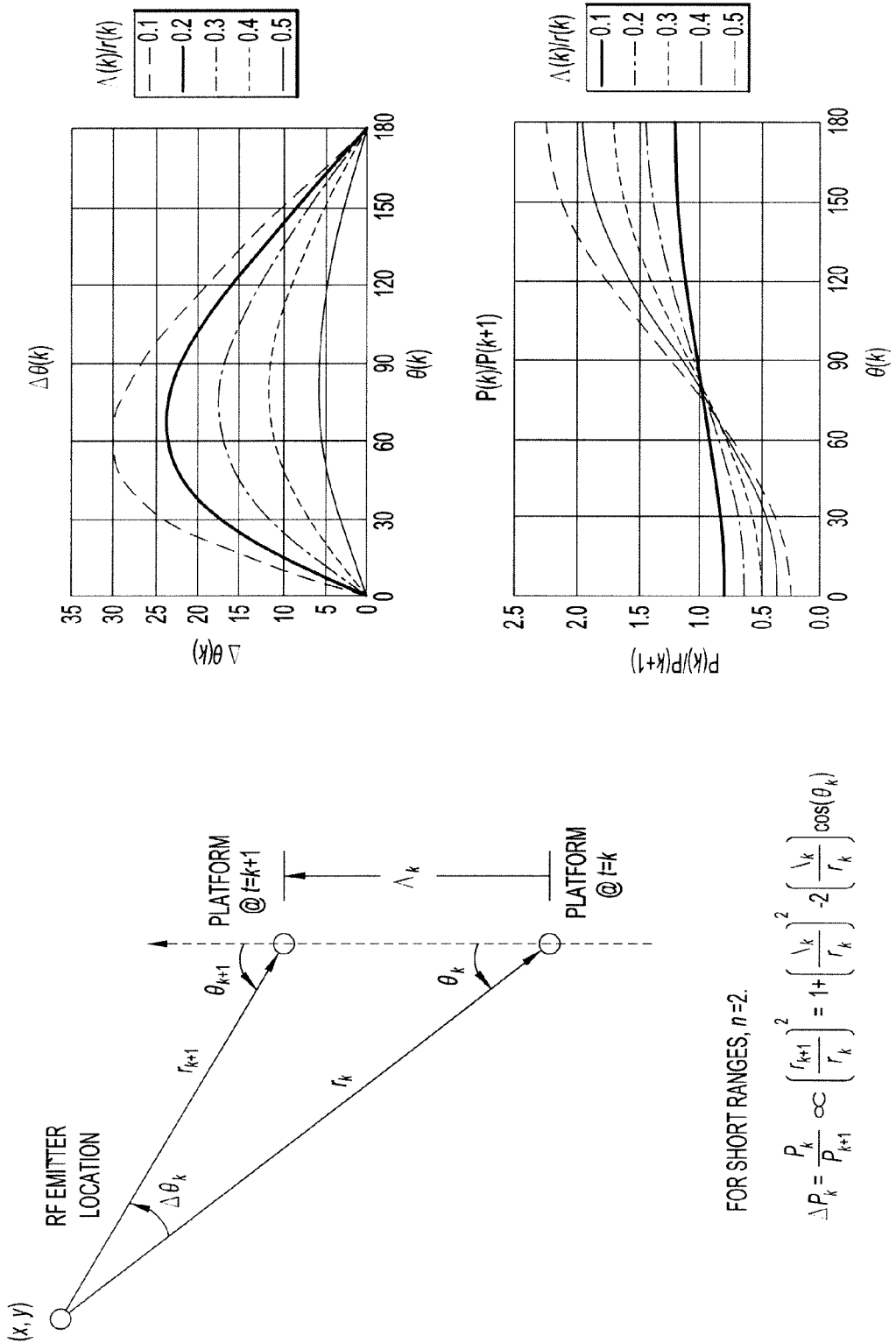
FIG. 13 shows example graphs depicting bearing sensitivity and RSS sensitivity for an RF emitter at bearings relative to sensor platform movement direction in accordance with an embodiment of the present invention.

As noted in FIG. 13, the bearing error sensitivity peaks around the bearing of 90°±30° (i.e., from 60° to 120°) and bases around the bearing of 0° and 180°, while the RSS/Energy error sensitivity peaks around the bearing of 0° and 180° and bases around ±75°. This implies that the Bearing based DOA approach should yield the best performance around bearings of |30° to 150°|, while the RSS/Energy based DOA approach should yield the best performance centered around the bearing of 0° degrees and 180° degrees, respectively. Thus, the change in bearing is the greatest when moving the RF sensor in a constant radius arc around the emitter, and the change in energy is greatest when moving the RF sensor direct toward or directly away from the emitter. In FIG. 13, n indicates the order of the path loss, i.e., n=2 for the $2^{nd}$ power law and n=4 for the $4^{th}$ power law.

SoS DF-GEO Concept and Approach

The SoS DF-GEO concept approach is enabled by the available wireless networks that remotely interconnect RF sensor variants of any type. Each RF sensor provides dynamic, multiple DF-GEO measures on each detected and processed threat/emitter signal emission via its own (RF sensor) antenna and processing resources. The interconnecting network supports features such as local subnets and multicast groups which provide the required communications capability to share information. The SoS management and communications capabilities enable the SoS DF-GEO approach to opportunistically leverage both on-board and off-board processing resources as well as DF-GEO measures for cooperative processing and situation awareness (SA) sharing. As shown, the key parameters or coefficients $$\beta_i = \left[\frac{r_i^2}{r_0^2} - 1\right] \text{ for } i = 1, \ldots, m,$$

must be derived from measurements and the localization equations may be solved. The achievable accuracy of the localization depends on how well the key parameters $$\beta_i = \left[\frac{r_i^2}{r_0^2} - 1\right] \text{ for } i = 1, \ldots, m.$$

are presented.

For the one-antenna system, $$\beta_i = \left[\left(\frac{E_0}{E_i}\right)^{\frac{n}{2}} - 1\right] \text{ for } i = 1, \ldots, m,$$

are derived from the energy measurements and the estimation of the path loss order n. Obviously, if the actual path loss characteristics deviate from the assumed, the location estimation would be erroneous. Because of the potential localization error, it is desirable to spatially average the measuring data obtained from a local region having similar path loss characteristics.

For the two-antenna system, $$\beta_i = \left(\frac{\sin(\theta_{0i})}{\sin(\theta_i)}\right)^2 - 1 \text{ for } i = 1, \ldots, m$$

(referring to FIG. 8 for bearing notations), which means that the key parameters $\beta_i$ for i=1, . . . , m, may be obtained from the bearing estimates, which do not depend on the path loss order. To provide an optimized localization solution, the SoS approach uses an algorithm to determine the best set of $\beta_i$ for i=1, . . . , m, between the following two measures for each i:

$$\beta_i^E = \left[\left(\frac{E_0}{E_i}\right)^{\frac{2}{n}} - 1\right]$$

from the one-antenna energy measure, or $$\beta_i = \left(\frac{\sin(\theta_{0i})}{\sin(\theta_i)}\right)^2 - 1$$

from the two-antenna bearing measure.
Putting it into a generalized expression yields the following formulation:

$$\beta_i^{SoS} = w_i^E \beta_i^E + w_i^\theta \beta_i^\theta$$

where $\beta_i^{SoS}$ denotes the optimized SoS parameter $\beta$ at $i^{th}$ location for geolocating the target; $w_i^E$ and $w_i^\theta$ denote the weighting factors for $\beta_i^E$ and $\beta_i^\theta$, respectively.

It should be understood that the techniques described herein are not limited to any particular antenna configurations and/or any particular applications. The SoS DF-GEO approach, management, and communications capabilities can opportunistically leverage both on-board and off-board processing resources and DF-GEO measures for cooperative processing, SA sharing, and performance optimization. The SoS DF-GEO concept approach will work effectively for either a standalone RF sensor or multiple networked RF sensors.

The SoS DF-GEO concept approach is enabled by available wireless networks that may remotely interconnect RF sensor variants of any type. The interconnecting network supports features such as local subnets and multicast groups which provide the required communications capability to share information. Each RF sensor provides dynamic, multiple DF-GEO measures on each detected and processed threat signal emission via its own (RF sensor) antenna and processing resources.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What is claimed is:

1. A method for locating an emitter of interest comprising:
generating a plurality of energy measures for signals received from the emitter of interest at a minimum of four different locations by at least first and second signal processing systems, wherein at least one of the first and second signal processing systems resides on a mobile platform in order to obtain measurement at the minimum of four different locations, wherein each signal processing system comprises an omnidirectional antenna and a directional antenna, and wherein the plurality of energy measures comprise first energy measures for signals received from the emitter of interest at an omnidirectional antenna and second energy measures for signals received from the emitter of interest at a directional antenna;
receiving, at a geolocation system, the energy measures generated by the at least first and second signal processing systems and coordinates of the at least first and second signal processing systems corresponding to each energy measurement location, wherein the geolocation system is collocated with one of the at least first and second signal processing systems or at a location apart from the at least first and second signal processing systems; and
computing directions of arrival (DOAs) for signals received at the minimum of four different locations based on a comparison of an antenna pattern of a corresponding directional antenna and the first and second energy measures; and
computing, by the geolocation system, geolocation data for the emitter of interest using the plurality of energy measures generated by the at least first and second signal processing systems and DOAs.

2. The method of claim 1, wherein generating comprises one or more of generating a received signal strength (RSS)

and summing received signal strength (RSS) samples taken over a predetermined time interval.

3. The method of claim 1, wherein computing geolocation data comprises simultaneously solving a set of equations based on the first and second energy measures received from the at least first and second signal processing systems, and the DOAs.

4. The method of claim 3, wherein solving comprises solving the set of equations using a Least Mean Square Error method.

5. The method of claim 3, further comprising computing a parameter for each equation in the set of equations based on the first and second energy measures and DOAs obtained at the corresponding locations from among the minimum of four different locations.

6. The method of claim 5, wherein computing the parameter for each equation in the set of equations comprises computing one of a parameter based on a ratio of energy measures obtained at two locations and a parameter based on a ratio of sines of DOAs obtained at two locations, wherein the ratio of the energy measures is raised to a power order related to path loss at a corresponding location.

7. The method of claim 5, wherein computing the parameter for each equation in the set of equations comprises computing a weighted average of an energy based parameter and a DOA based parameter.

8. A system comprising a geolocation system, and at least a first and a second signal processing system, each signal processing system comprising:
    an omnidirectional antenna and a directional antenna;
    one or more detectors configured to generate energy measures for signals received from an emitter of interest;
        a first interface unit configured to enable communication over a network, wherein the first interface unit is further configured to transmit energy measures, coordinates associated with corresponding energy measures, directions of arrival (DOAs) computed for the emitter of interest, and coordinates associated with corresponding DOAs; and
    a first processor configured to compute DOAs based on a comparison of an antenna pattern of the directional antenna and energy measures for signals associated with the emitter of interest received at the omnidirectional and the directional antenna; and
    the geolocation system comprises:
    a second interface unit configured to enable communication over the network, wherein the second interface unit is configured to receive energy measures, DOAs computed for the emitter of interest, and coordinates associated with corresponding received energy measures and DOAs computed for the emitter of interest; and
    a second processor configured to compute geolocation data for the emitter of interest using the energy measures and DOAs, and coordinates received from the at least first and second signal processing systems, wherein the at least first and second signal processing systems generate energy measures at a minimum of four different locations and wherein the at least first and second signal processing systems are stationed at different fixed locations or reside on mobile platforms that each operate at multiple locations, respectively.

9. The system of claim 8, wherein the one or more detectors are configured to generate an energy measure comprising a received signal strength (RSS).

10. The system of claim 8, wherein the one or more detectors are configured to generate an energy measure comprising a received signal strength (RSS) and the first processor is further configured to sum received signal strength (RSS) samples taken over a predetermined time interval.

11. The system of claim 8, wherein the second processor is configured to compute geolocation data by simultaneously solving a set of equations based on the energy measures received from the at least first and second signal processing systems at the minimum of four different locations and DOAs computed by the first signal processing system.

12. The system of claim 11, wherein the second processor is configured to solve the set of equations using a Least Mean Square Error method.

13. The system of claim 11, wherein the second processor is further configured to compute a parameter for each equation in the set of equations based on the energy measures and/or DOAs obtained at the corresponding locations from among the minimum of four different locations.

14. The system of claim 13, wherein the second processor is configured to compute the parameter for each equation in the set of equations based on a ratio of energy measures obtained at two locations and a parameter based on a ratio of a sines of DOAs computed from energy measures obtained at the two locations, wherein the ratio of the energy measures is raised to a power order related to path loss at a corresponding location.

15. The system of claim 13, wherein the second processor is further configured to compute the parameter for each equation in the set of equations that comprises a weighted average of an energy based parameter and a DOA based parameter.

16. A non-transitory computer readable tangible medium storing instructions that, when executed by a geolocation system processor, cause the geolocation system processor to:
    receive a plurality of energy measures from an emitter of interest generated by a first signal processing system using an omnidirectional antenna and a directional antenna and coordinates of the first signal processing system corresponding to each energy measurement location, wherein the first processing system is stationed at a fixed location or resides on a mobile platform that operates along a path;
    receive a plurality of energy measures from the emitter of interest generated by a second signal processing system using an omnidirectional antenna and a directional antenna and coordinates of the second signal processing system corresponding to each energy measurement location, wherein the second processing system resides on a mobile platform that operates along a path such that the plurality of energy measures generated by the at least first and second signal processing systems are received from an emitter of interest at a minimum of four different locations;
    computing directions of arrival (DOAs) for signals received at the minimum of four different locations based on a comparison of an antenna pattern of the directional antenna and energy measures obtained at a corresponding location; and
    compute geolocation data for the emitter of interest using the plurality of energy measures generated by the at least first and second signal processing systems and the DOAs.

17. The non-transitory computer readable tangible medium of claim 16, wherein the instructions that receive the plurality of energy measures comprise instructions to receive a received signal strength (RSS) or receive a sum of RSS samples taken over a predetermined time interval.

18. The non-transitory computer readable tangible medium of claim 16, wherein the instructions that compute comprise instructions to simultaneously solve a set of equations based on the energy measures and the DOAs using a Least Mean Square Error method.

19. The non-transitory computer readable tangible medium of claim 18, and further comprising instructions that, when executed by the geolocation system processor, cause the geolocation system processor to compute a first parameter for each equation in the set of equations based on a ratio of energy measures obtained at two locations, and a second parameter for each equation in the set of equations based on a ratio of sines of DOAs computed from the energy measures obtained at the two locations, wherein the ratio of the energy measures is raised to a power order related to a path loss.

20. The non-transitory computer readable tangible medium of claim 19, and further comprising instructions that, when executed by the geolocation system processor, cause the geolocation system processor to compute a third parameter for the set of equations that is a weighted average of the first parameter and the second parameter.

* * * * *